W. L. ASHMORE AND H. R. POWELL.
DEVICE FOR FINISHING CONCRETE PAVEMENTS.
APPLICATION FILED SEPT. 15, 1919. RENEWED NOV. 9, 1920.
1,364,606.
Patented Jan. 4, 1921.
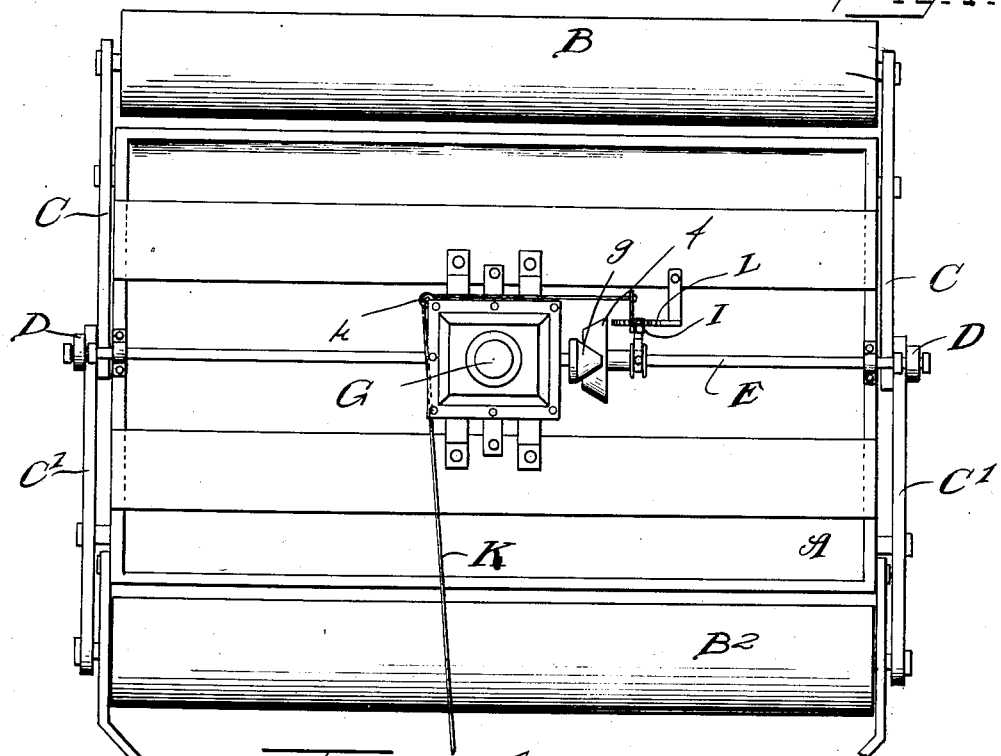
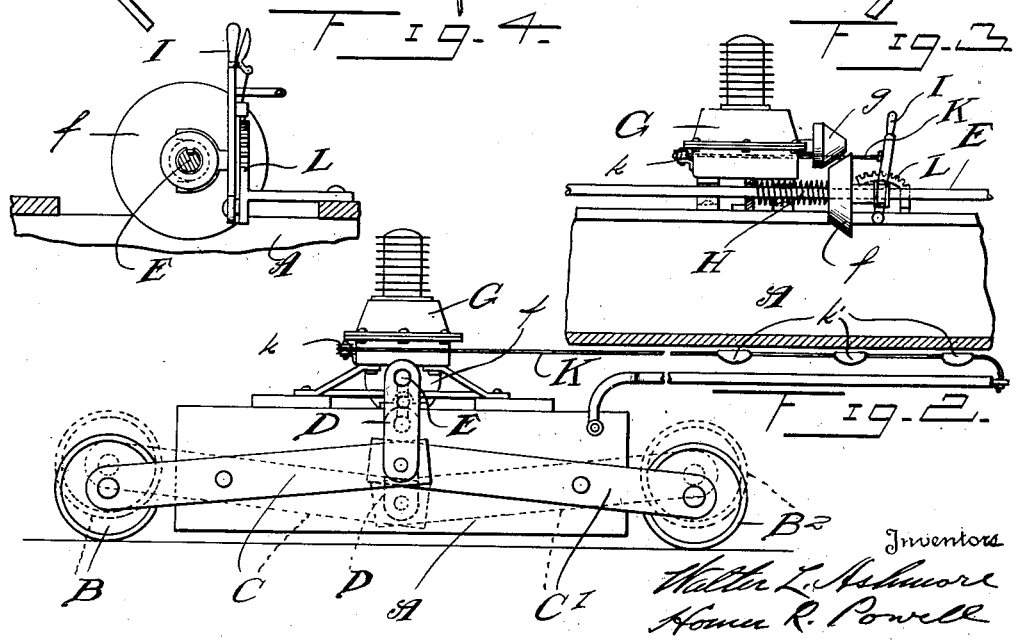

UNITED STATES PATENT OFFICE.

WALTER L. ASHMORE AND HOMER R. POWELL, OF MACON, GEORGIA.

DEVICE FOR FINISHING CONCRETE PAVEMENTS.

1,364,606.  Specification of Letters Patent.  Patented Jan. 4, 1921.

Application filed September 15, 1919, Serial No. 323,697. Renewed November 9, 1920. Serial No. 422,958.

*To all whom it may concern:*

Be it known that we, WALTER L. ASHMORE and HOMER R. POWELL, citizens of the United States, residing at Macon, in the county of Bibb and State of Georgia, have invented certain new and useful Improvements in Devices for Finishing Concrete Pavements; and we do hereby declare the following to be a full, clear, and exact description of the invention, such as will enable others skilled in the art to which it appertains to make and use the same.

This invention relates to means for finishing concrete pavements.

The primary object of the invention is to provide a simple and efficient rolling and pressing or packing device with an engine or motor thereon for imparting what may be termed a vibrating pressure on the surface of the concrete mass, as the device is moved to and fro over the surface of the concrete with the entire weight of the machine thrown on a pressure plate or on rollers and the engine or motor running loose.

The invention will first be hereinafter more particularly described, with reference to the accompanying drawings, which are to be taken as a part of this specification, and then pointed out in the claims at the end of the description.

In said drawings—

Figure 1 is a plan view of a device embodying our invention;

Fig. 2 is a side elevation of the same, illustrating in dotted lines the rollers in raised position; and Figs. 3 and 4 are detail sectional views of broken away portions of the machine.

Referring to said drawings, in which the same reference letters are used to denote corresponding parts in different views, the letter A denotes a roller-supporting frame and pressure plate arranged between two rollers B and $B^1$, the shafts or axles of which have their bearings in supporting frames or bars C and $C^1$, pivoted intermediate their ends to said frame or pressure plate. The inner ends of the bars C and $C^1$ are pivotally connected by links D to cranks $e$ on the ends of a crank shaft E, which is journaled in suitable bearings on said frame or pressure plate. Said shaft E has secured thereon, a conical disk or friction clutch member $f$, by spline and groove connection, to adapt it to rotate with the shaft while permitting a sliding movement thereof longitudinally of the shaft, said conical member being arranged adjacent a cone member $g$ fixed on the shaft of a gas or other engine or motor G mounted on the machine so that by engagement of the two members of the clutch the crank shaft may be rotated so as to raise the rollers as indicated in dotted lines in Fig. 2, through the medium of the links connecting the ends of the crank shaft E with the inner ends of the roller supporting frames. The clutch member $f$ is pressed by a coiled or other suitable spring H normally out of engagement with the cone member $g$ and may be thrown into engagement therewith by means of a hand lever I, pivoted on the machine frame and carrying a stud or pin engaging a groove in a projecting hub portion of the clutch member $f$ for sliding the latter lengthwise of the crank shaft; such lever provided with the usual pawl and ratchet for engagement with a rack bar L, whereby the clutch members may be held in engaged or disengaged position as desired in the operation of the machine.

The pressure plate is preferably about two feet wide and from seven to nine feet long, and may be either plain, convex or concave, and constructed preferably of eight to twelve gage steel plate, though it may be made of wood or other material. The rollers are of the type shown in patent to Ashmore and Morgan No. 1,273,022, dated July 16, 1918, being of small diameter and light weight and preferably hollow and liquid tight, to adapt them to float on freshly laid concrete and act on the surface thereof as a straight edge for straightening and smoothing such surface.

When the clutch members are engaged the engine or motor will lift the rollers and throw the entire weight of the machine on the pressure plate, and while in this position, the engine being allowed to run loose, for a short time, to be determined by the operator, it will impart to the pressure plate what we term a vibrating pressure. On a reverse movement the rollers will be lowered, raising the pressure plate so as to throw the entire weight of the machine on the rollers, and in this position the concrete may be rolled by moving the device forward and backward over the surface of the concrete, and so on, thus pressing down high places and filling in low places and bringing the concrete mass to a regular or uniform surface.

To enable the operator to manipulate the device while standing at the end of the bail handle, or on one side of the road, a cord or wire K is secured at one end to the lever I and extends around a pulley $k$ within convenient reach of the operator for engaging and disengaging the clutch members by pulling said cord so as to cause the rollers to be raised and lowered as desired; the ratchet and pawl being disengaged and so held when the cord is used. The handle end of the cord has enlargements $k^1$ thereon for gripping the same with a firm hold.

The machine may be drawn back and forth with the weight resting either on the pressure plate or on the rollers for packing and squeezing out and eliminating any excess water, and by such alternate pressing and rolling the concrete mass is made very compact and the surface thereof is made smooth so as to get a final smooth finish. If desired, the weight of the pressure plate may be increased by placing a sack of cement or other weight thereon at each end, thus converting the light pressure device for use on comparatively soft concrete, into a heavy pressure machine for very stiff concrete, brick, or other paving; the device being thus adapted for use on stiff immobile concrete and with monolithic brick paving, or on wood block paving, when laid out direct on a soft or similar concrete or cement base.

Having thus described our invention, what we claim as new and desire to secure by Letters Patent is:

1. A device for finishing concrete pavements and the like comprising a pressure-plate and rollers and an engine or motor mounted thereon, together with means for throwing the entire weight on either the rollers or the pressure plate while the engine is allowed to run loose, thus producing a vibrating pressure of the device on the concrete.

2. A device for finishing concrete pavements comprising a pair of rollers and an intermediate pressure plate, said rollers being journaled in supporting frames which are pivoted to said pressure plate, an engine or motor mounted on said pressure plate, and connections between the engine and rollers whereby the rollers may be raised and the pressure plate lowered, or vice versa, to throw the entire weight of the machine on either the pressure plate or the rollers, as desired.

3. A device for finishing concrete pavements comprising a pair of rollers and an intermediate pressure plate; said rollers being journaled in supporting frames which are pivoted intermediate their ends to said pressure plate, an engine or motor mounted on said pressure plate, a crank shaft rotatably mounted on said pressure plate, links connecting cranks on said shaft with the inner ends of said roller frames, and a friction clutch having one member slidably fitted on said shaft and a cone member on the motor shaft, whereby the rollers may be raised or lowered to throw the entire weight either on the rollers or pressure plate, as desired.

4. In combination, roller-supporting frames pivoted intermediate their ends to a pressure plate or frame carrying a pressure plate, an engine or motor mounted on said frame, a crank shaft journaled in bearings on said frame, a friction clutch element on the motor shaft adapted to engage a similar element on said crank shaft, and intermediate connections, whereby the rollers may be raised or lowered to throw the entire weight of the machine thereon or on the pressure plate, as desired.

In testimony whereof we affix our signatures in the presence of two witnesses.

WALTER L. ASHMORE.
HOMER R. POWELL.

Witnesses:
  L. D. MOORE,
  P. G. HOGAN.